3,473,892
METHOD FOR THE PRODUCTION OF NITROGEN
PEROXIDE
Adrien Devaux and Gérard Aubin, Douai, France, assignors to Societe Chimique de la Grande Paroisse, Azote et Produits Chimiques
Filed June 6, 1966, Ser. No. 555,430
Claims priority, application France, June 30, 1965, 22,850
Int. Cl. C01b 21/26
U.S. Cl. 23—162         3 Claims

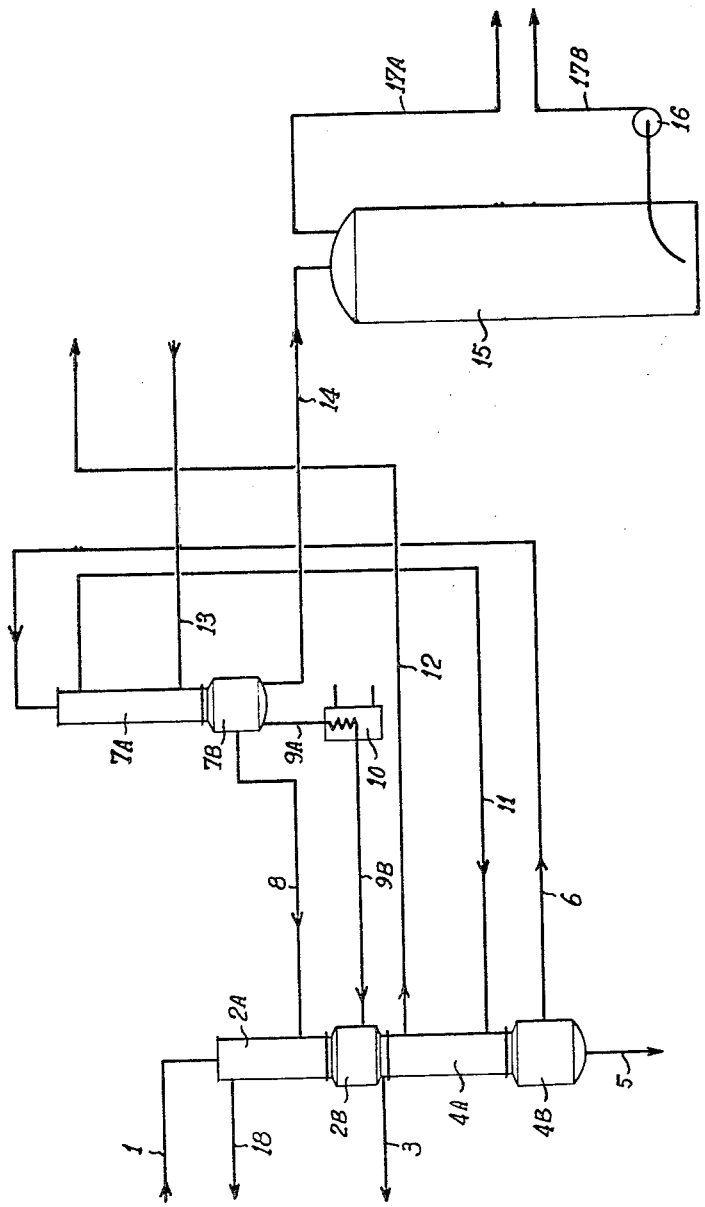

ABSTRACT OF THE DISCLOSURE

A method is disclosed for the production of pure nitrogen peroxide from "nitrous gases" resulting from the oxidation of ammoniac with atmospheric or enriched air for the production of nitric acid, which comprises progressively cooling the "nitrous gases" and drawing off product in three cooling stages, the first cooling stage resulting in the separating nitric acid containing water and nitrogen peroxide being conducted at a temperature between $+5°$ C. and $+12°$ C., the second cooling stage resulting in the separation of a fraction of nitrogen being conducted in the neighborhood of $0°$ C. and the last cooling stage resulting in the separation of a fraction with the highest concentration of nitrogen peroxide being conducted in the neighborhood of $-10°$ C., and a portion (about 30%) of the product drawn off in the last cooling stage being vaporized and recirculated to between the first and second cooling stages.

---

This invention relates to a method for the commercial production of pure nitrogen peroxide. The product is manufactured with a sufficient purity to allow its use e.g. for the propulsion of rockets or ballistic missiles.

A mixture of air or oxygen-enriched air and of gaseous ammonia in concentrations usually lying between 8% and 12% by volume is known to give, through catalytic treatment over platinum, a mixture consisting of nitrogen, excess oxygen, steam, nitrogen dioxide and impurities from atmospheric air.

The said mixture might conceivably be cooled to extract most of the steam it contains as more or less concentrated nitric acid; with an adequate reaction time, suited to the temperature and pressure, the nitric oxide being oxidized to nitrogen peroxide and the latter dimerized, according to the well-known reactions:

$$2NO + O_2 = 2NO_2 \quad (1)$$

$$2NO_2 = N_2O_4 \quad (2)$$

a sufficient total concentration of nitrogen peroxide ($NO_2$ and its dimer $N_2O_4$) might be reached to allow the separation of liquid nitrogen peroxide from the mixture (hereinafter referred to as "nitrous gases") by cooling the mixture.

The lower the cooling temperature under a given pressure, the larger the amount of nitrogen peroxide obtained; however, in commercial practice, owing to the temperature of crystallization of the product, it is advisable not to cool below $-11°$ C. so as to avoid the formation of solid deposits of nitrogen peroxide (predominantly $N_2O_4$), which would choke the equipment.

Such a method, however, cannot directly give sufficiently pure nitrogen peroxide to warrant its use for propelling purposes, for instance.

In some prior art methods, the "nitrous gases" are subjected to progressive cooling to a temperature slightly above the freezing point of nitrogen peroxide, with fractional drawing off the liquid products. When the products are drawn off at progressively decreasing temperatures, the isolated fractions become richer in nitrogen peroxide as the temperature gets nearer to the freezing point of the latter ($-11°$ C.). Water diluted nitric acid and nitrogen peroxide are first drawn off between $+5°$ C. and $+12°$ C.; then a first fraction of nitrogen peroxide is drawn off around $0°$ C.; then a more concentrated fraction is drawn off towards $-10°$ C.

Such fractionated drawing off progressively eliminates first water, then nitric acid, from the gaseous phase. Theoretically, an installation including several successive cooling (or condensing) and drawing off stages should give a product of high purity, since it is always possible to draw off water and nitric acid until the final product reaches the required purity. However, when the above-described method is used, it is found that the purity does not exceed 97.5%.

According to this invention, a method has been found for the production of pure nitrogen peroxide from "nitrous gases" from the commercial oxidation of ammonia with atmospheric air, whether oxygen-enriched or not, notably for the production of nitric acid. This method, in which the "nitrous gases" are subjected to progressive cooling, the three levels of cooling being chosen as specified above, makes it easy to obtain continuously, without any distillation, a final product containing at least 99% nitrogen peroxide.

The new method comprises the recirculation, ahead of the second cooling stage, of a vaporized portion of the product drawn off in the last cooling stage.

The ratio of recirculated product may be varied within fairly wide limits, but should preferably be kept low, i.e. between 25% and 35% of the total amount drawn off in the last cooling stage. When the recirculated amount is thus limited, it is found essential to vaporize the recirculated product prior to its reinjection, which is effective only if the product is in the gaseous state. The drawing off temperatures remain spaced as above.

The reinjection of a portion of the product drawn off in the third cooling stage does not necessitate the introduction of a pump into the recirculating system. In practice, according to an embodiment of the invention, reinjection may be effected without the need for a pump, by use of a special device: the final condenser is placed above the condenser immediately ahead of it, a vaporizing coil being interposed between the two condensers. Recirculation is preferably effected ahead of the second cooling stage.

Moreover, the residual "nitrous gas" may be sent back, through a heat exchanger, to the nitric acid absorber.

As a non-restrictive example, an installation for the production of nitrogen peroxide according to the invention, diagrammatically shown on the appended drawing, shall be described hereafter.

According to the diagram, the "nitrous gases," after having been thoroughly oxidized and dimerized, flow through line 1 into the first condenser, which includes a cooling stage 2A, and a drawing off stage 2B, at a temperature around $+11°$ C. Beneath the first condenser is a second condenser having a cooler 4A and drawing off stage 4B, provided with a temperature around $0°$ C. The first drawing off, which chiefly eliminates the steam and nitric acid from the gaseous phase, is effected through duct 3 at the bottom of portion 2B of the first condenser, while the second drawing off is effected through line 5 in the lower portion 4B of the second condenser which yields 95.5% pure nitrogen peroxide. The nitrogen peroxide drawn off in the second stage and the acid from duct 3 are recirculated to the nitric acid production unit.

The fraction of the product which has not been drawn off is then sent through line 6 to the third or final condenser, the upper portion of which comprises the third cooling stage 7A, where the product is cooled to $-10°$ C. At the bottom 7B of the condenser, the liquid fraction of the product is drawn off through duct 9A, vaporized in a vaporizing coil 10, and reinjected in the gaseous state, around $+45°$ C., through duct 9B ahead of the second cooling stage.

The residual "nitrous gas" extracted from the final condensing stage 7B is recirculated through line 8. After it has gone through the first cooler 2A, which plays the part of a heat exchanger, it is reintroduced into the nitric acid absorbing unit through line 18.

99.35% pure nitrogen peroxide product is drawn off through duct 14 at the bottom of the final condenser 7B and sent to storage 15. The nitrogen peroxide stored in 15 is sent to end use through line 17A and line 17B, the latter including a pump for decanting 16.

The condensing units are cooled by means of circulating brine. The cold brine is introduced through duct 13 into the cooling mantle of the final cooling stage 7A, then sent through duct 11 to the bottom of the second cooling stage 4A, and emerges at the top of the latter through duct 12.

Two modes of operation of the installation, which differ essentially by the ratio of recirculated product, are given hereafter as non-limitative illustrations.

EXAMPLE 1

Flow rate of "nitrous" gas treated: 2,124 m.³/hr. under normal temperature and pressure.
Effective pressure: 6.5 bars.

EXAMPLE 1

| Drawing off temperature | Percent NO₂ in drawn off liquid | Amount drawn off per hour, kg. |
|---|---|---|
| 1st condenser (2) +11° C | | |
| 2nd condenser (4) −1° C | 95.5 | 42 |
| 3rd condenser (7) −10.5° C | 99.35 | 108 |
| Recirculation | | 39 |
| Nitrogen peroxide | | 69 |

EXAMPLE 2

Flow rate of "nitrous gas" treated: 2,195 m.³/hr. under normal temperature and pressure.
Effective pressure: 6.5 bars.

EXAMPLE 2

| Drawing off temperature | Percent NO₂ in drawn off liquid | Amount drawn off per hour kg |
|---|---|---|
| 1st condenser (2) +12° C | | |
| 2nd condenser (4) −1° C | 95.8 | 57 |
| 3rd condenser (7) −10.5° C | 99.35 | 154.5 |
| Recirculation | | 39 |
| Nitrogen peroxide | | 115.5 |

What we claim is:

1. A method for the separation of pure nitrogen peroxide from nitrous gases comprising nitrogen, oxygen, steam and nitrogen peroxide, resulting from the oxidation of ammonia with atmospheric or oxygen enriched air for the production of nitric acid, which method comprises progressively cooling said nitrous gases and drawing off product in three cooling stages, the first cooling stage resulting in the separation of dilute nitric acid and nitrogen peroxide being conducted at a temperature between $+5°$ C. and $+12°$ C., the second cooling stage resulting in the separation of a fraction of nitrogen peroxide being conducted in the neighborhood of $0°$ C., and the last cooling stage resulting in the separation from the nitrous gases of a fraction with the highest concentration of nitrogen peroxide being conducted in the neighborhood of $-10°$ C. and leaving residual nitrous gas after said last cooling stage, and a portion of the nitrogen peroxide product drawn off in the last cooling stage being recirculated to between the first and second cooling stages.

2. A method according to claim 1 in which the ratio of recirculated product lies between 25% and 35% of the total amount drawn off in the last cooling stage, and in which the said recirculated product is vaporized prior to reintroduction.

3. A method according to claim 2 in which the residual nitrous gases from said last cooling stage are recirculated to the nitric acid production stage after passing in heat exchange with the material in said first cooling stage.

References Cited

UNITED STATES PATENTS

| 1,948,968 | 2/1934 | Kramer et al. | 23—157 |
| 2,761,761 | 9/1956 | Congdon et al. | 23—160 |
| 2,169,826 | 8/1939 | Wendlandt | 23—162 |
| 3,063,804 | 11/1962 | Morrow | 23—162 |
| 3,070,425 | 12/1962 | Grossmann | 23—157 |
| 3,101,255 | 8/1963 | Carr et al. | 23—162 |
| 3,136,602 | 6/1964 | Berger | 23—162 |

OSCAR R. VERTIZ, Primary Examiner
G. O. PETERS, Assistant Examiner

U.S. Cl. X.R.
23—157